United States Patent [19]

Langezaal et al.

[11] Patent Number: 5,218,783

[45] Date of Patent: Jun. 15, 1993

[54] AGROBLOCK, SUCH AS AGROPLUG, AGROPLUG SYSTEM AND A PLUG STRIP THEREFOR

[75] Inventors: Lucas E. M. Langezaal, Breda; Jacob F. de Groot, Roermond, both of Netherlands

[73] Assignee: Rockwool Lapinus B.V., Netherlands

[21] Appl. No.: 376,356

[22] Filed: Jul. 6, 1989

[30] Foreign Application Priority Data

Jul. 7, 1988 [NL] Netherlands ................. 8801724

[51] Int. Cl.$^5$ .................. A01G 31/00; C10L 5/40
[52] U.S. Cl. ............................. 47/64; 47/74
[58] Field of Search .......... 47/85, 86, 74, 64, 87, 47/48.5, 73; 71/903, 904, 64.13

[56] References Cited

U.S. PATENT DOCUMENTS

| | | | |
|---|---|---|---|
| 2,785,969 | 3/1957 | Clawson | 71/64.13 |
| 2,982,665 | 8/1957 | Wilcox | 71/904 |
| 3,797,738 | 3/1974 | Fitzhugh | 47/48.5 |
| 3,973,355 | 10/1976 | McKenzie | 71/64.13 |
| 3,981,100 | 9/1976 | Weaver et al. | 47/DIG. 12 |
| 4,023,308 | 5/1977 | Staby | 47/48.5 |
| 4,168,962 | 9/1979 | Lambeth | 71/904 |
| 4,299,054 | 11/1981 | Ware | 47/64 |
| 4,389,814 | 6/1983 | Andreason et al. | 47/73 |
| 4,769,277 | 9/1988 | Meunier | 428/280 |
| 4,777,763 | 10/1988 | Shannon et al. | 47/74 |
| 4,785,578 | 10/1988 | Grene | 47/86 |
| 4,786,308 | 11/1988 | Colling | 71/904 |

FOREIGN PATENT DOCUMENTS

| | | |
|---|---|---|
| 156786 | 10/1985 | European Pat. Off. |
| 249261 | 12/1987 | European Pat. Off. |
| 2915370 | 10/1980 | Fed. Rep. of Germany |
| 3121266 | 1/1983 | Fed. Rep. of Germany |
| 2039460 | 1/1971 | France |

Primary Examiner—Carl D. Friedman
Assistant Examiner—Michele A. Van Patten
Attorney, Agent, or Firm—Ostrolenk, Faber, Gerb & Soffen

[57] ABSTRACT

The invention relates to an agroblock comprising an inorganic soil type, such that the agroblock is substantially form-retaining at any moisture content and that at a suction pressure of pF 2 the moisture content amounts to at least 15% by volume. Preferably the agroblock comprises a homogeneous mixture of mineral wool and said inorganic soil type, wherein the quantity of mineral wool amounts to 0-90% by weight, and the amount of soil type amounts to 100-10% by weight.

20 Claims, 1 Drawing Sheet

AGROBLOCK, SUCH AS AGROPLUG, AGROPLUG SYSTEM AND A PLUG STRIP THEREFOR

The present invention relates to an agroblock.

An agroblock is intended to grow plants in and an agroplug is specifically intended for making seed germinate and root in a carrier medium, in particular under determined conditions. The plug is subsequently planted out in the open field with the plant growing therein, preferably in automated manner. During the first days after planting out the plant must have sufficient water available in order to enable inter alia the forming root into the open ground, so that from then on the plant can extract water and nutrients from the ground.

The consequence of all this is that after being placed in the open field the agroplug may not be drained dry by the surrounding open ground but must preferably be capable of itself extracting water from the open ground.

The agroblock must of course possess a structure such that plants can grow and seed can germinate and root, and that in addition root development is substantially not impeded.

Materials to be used for the agroblock may not be toxic or cause any spontaneous bacteria and/or mould growth.

Since after receiving a plant or a seed an agroblock is regularly provided with water through spraying, the leaching of agroplug components has to be as small as possible, in preference less than 10 and more preferably less than 5% by weight based on the total weight of the agroplug.

In order to enable automated handling and planting out of an agroplug, the plug must be deformable only to a limited extent, even after saturation with water, and it must preferably be possible to grip the agroplug with mechanical elements without it thereby falling apart.

A preferred property further is that the plug disintegrates in the ground within a period of time of for example six months and that no or hardly any trace thereof is later found.

It has been found after long-term research that an agroblock and agroplug satisfy these conditions if use is made of an inorganic soil type, such that the agroplug is substantially form-retaining at any moisture content and that at a suction pressure of pF 2.0 the moisture content amounts to at least 15% by volume.

The soil type comprises soil materials comprising hydrophillic particles of a particle size below 20 micrometers, belonging to the class of eroded minerals, such as clays, mixtures of clay with silt and sand having a clay fraction removable as sludge of at least 20%, and further bentonite, kaolin and the like. Particularly suitable are different naturally occurring types of clay or mixtures thereof, such as young sea clay. Examples are clays comprising 0-100%, preferably 10-50%, most preferable particles smaller than 20 $\mu$m.

Preferably the agroblock comprises a homogeneous mixture of mineral wool and said inorganic soil type. Accordingly the rigidity and form retaining capacity are improved.

Depending on the type of the open field into which the agroblocks and agroplugs are planted out (sand soil or clay soil) it can be of advantage if at a pF of 2 the moisture content amounts to at least 15% by volume, or in the case of for instance heavy sea clay, to at least 20% by volume. Most preferably the moisture content is at least 25% by volume at pF 2.

Depending on the type of open ground, and in addition on the kind of soil type (clay fraction) to be used, the quantity of mineral wool (fibre diameter 2-10 micrometer; fibre length 0.02-3 cm) may amount in general to 0-90% by weight, more particularly to 10-50% by weight, and preferably to 10-25% by weight. The amount of soil type thereby required amounts to 100-10% by weight, more particularly to 90-50% by weight and preferably 90-75% by weight.

In order to improve the cohesion of the agroblock it is recommended that under particular conditions a binder be added thereto. This binder can amount, depending on the nature of the binder and the soil type used, to 15% by weight, preferably 2-10% by weight and more preferably 3-7% by weight.

As binder may be used latexes, silicates, acrylates and methacrylates, in addition to conventional resins used during the preparation of mineral wool.

Illustrative examples for the binder are:
polyacrylic esters, polystyrene, polyurethane;
starch originating from potatoes, corn, such as cationic starch (Fibran, National Starch, both trademarks);
water soluble cellulose ethers, such as sodium carboxymethyl cellulose, methyl cellulose;
water glass and derivatives;
copolymers such as vinylchloride/vinylacetate;
water soluble latexes, such as styrene butadiene rubber, latex comprising carboxyl groups, polychloroprene latex;
water soluble polyvinyl alcohol;
water soluble polyvinyl pyrrolidone, and
urea formaldehyde resin or polyphenol formaldehyde resin.

The density of the agroblock is determined mainly by the quantity of inorganic raw material and particularly by the clay content. With an increase in the density the internal surface area increases and thereby the water retaining capability. Speaking generally, for each application the density lies between 250-1100 kg/m$^3$, more preferably between 300-900 kg/m$^3$ and under specific application between 500-850 kg/m$^3$.

The internal surface area of the agroblock is moreover also partially determined by the porosity, which is further of influence on the root development and the cohesion of the agroplug. Porosity therefore usually amounts to at least 50%, is preferably at least 60% and more preferably 70%.

In the handling and planting out of the agroplug, force is exerted mainly in lengthwise direction thereof. The tensile strength of such an agroplug is optimal if the fibre direction of the mineral wool consisting of fibres extends therein substantially in the height direction of the agroplug.

Preferably used are rockwool granulates of which the interstitial space can be optimally filled with the soil type.

Since an agroplug preferably has a cylindrical and conical form it will suspend freely in passage openings of strips and be easy to arrange in and remove from said strips.

The invention further relates to an agroplug system comprising a tray provided with at least one groove in which agroplugs accommodated in plug passage openings of a plug strip hang freely downward. If in preference the plug passage openings are located in a recessed strip portion that extends above the top end of the agroplug accommodated in the plug passage openings, the agroplug can be easily and sufficiently provided with water, while handling is optimal.

Finally, the invention relates to a plug strip for use in the agroplug system.

Mentioned and other features will be elucidated hereinafter on the basis of an embodiment of the agroplug system and experimental examples of the agroplug according to the invention. Reference is hereby made to the annexed drawing, in which.

In the manufacture of the agroplug ($\phi$3 cm; length 7 cm) according to the invention use can be made in accordance with a preferred embodiment of the so-called wet method. A mixture of young sea clay and rockwool is added to water and formed to a slurry. 5% by weight of binder (latex) is added to this slurry and mixed with it for some time. The mineral wool and the clay particles settle substantially with the same settling speed, with the result that a homogeneous mixture of mineral wool and clay particles is created and the above mentioned water is substantially clear. The water is then filtered off by suction through the settled layer which through further suction is dried and compacted.

Depending on the application the formed layer can be further compressed in order to increase the density, dried and processed into agroplugs.

Table 1 shows a number of agroplugs (#3-8) according to the invention and other plugs not according to the invention, which have been tested for density and water retaining capability (determined at a pF of 2.0, or 100 cm water column).

In order to determine the water retaining capability the plugs were saturated with water for approximately 2 hours and in a pF measuring container the quantity of water retained was determined at a pF of 2.

The plug consisting of 100% mineral wool contained no water at a pF of 2 and is therefore unsuitable. In the case of agroplugs 3-5 the effect of the density on water retaining capability is clearly visible.

From a comparison of the agroplug 4 with the "Vienna roll" plug 10 the effect of homogeneity on the water retaining capability will become apparent.

Table 2 shows the effect of another soil type used on the water retaining capability. The agroplugs were formed using the above described preparation procedure and clay comprising 25-30% particles smaller than 20 micrometer. The agroplugs #13-15 fulfill the requirements of the present invention.

To sum up, it has been found that when the soil into which the agroplug is placed has a high moisture pressure the agroplug according to the invention can be adapted thereto by adapting the quantity of soil type relative to the quantity of mineral wool and/or by increasing the density.

Figure 1:
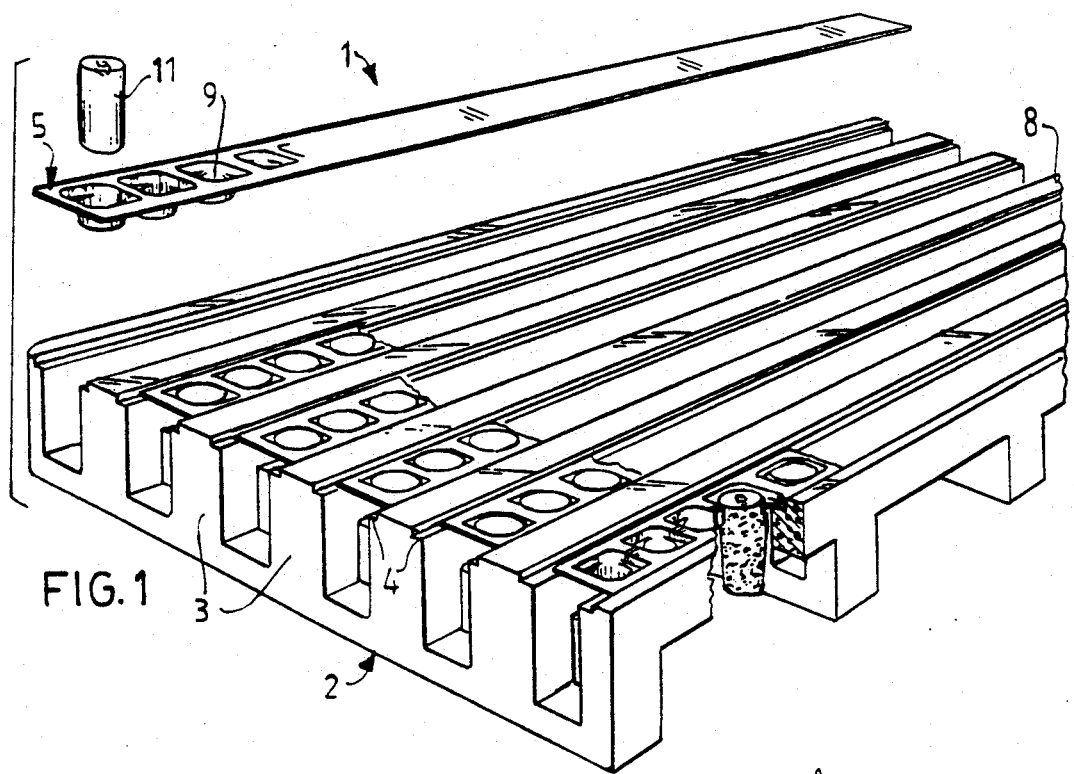
FIG. 1 shows a perspective partly broken away view of the agroplug system.

FIG. 1 shows the agroplug system according to the invention.

The agroplug system 1 comprises a tray 2 with parallel ridges 3 which are furnished with recesses 4 in which rests a plug strip 5 with its longitudinal edges 6, the strip not thereby protruding above the upper surface 8 of tray 2.

Figure 2:
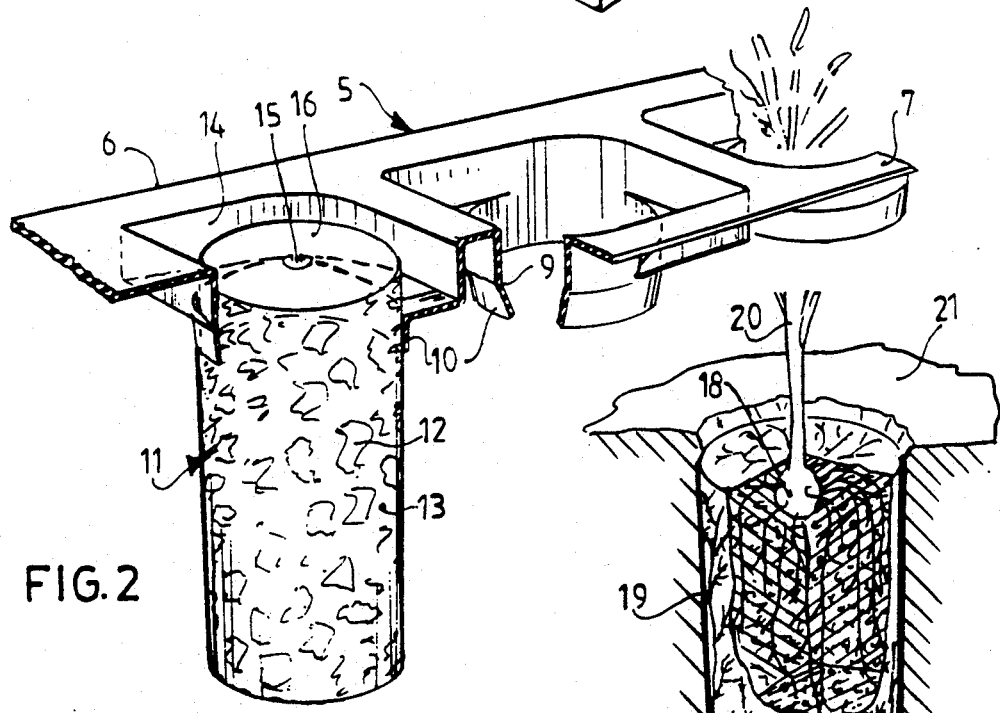
FIG. 2 shows on a larger scale a partly broken away view of a plug strip from FIG. 1.
Figure 3:
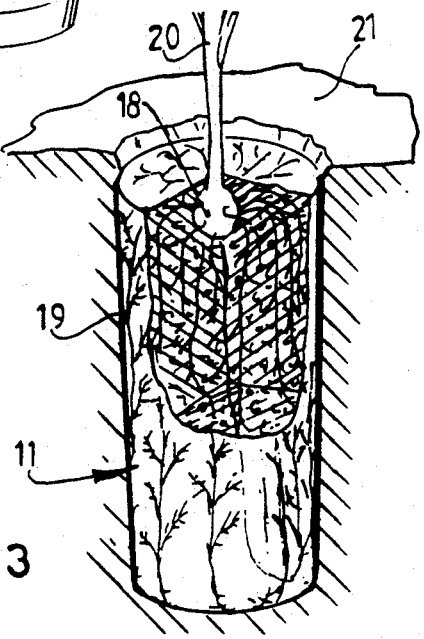
FIG. 3 shows a perspective partly broken away view of the planting out of the agroplug.

As is shown in more detail in FIG. 2 the plug strip 5 comprises circular round plug passage openings 9 with a downward converging passage opening edge 10 which makes a clamp fitting with the exterior surface of the agroplug 11 which consists of a congruent, homogeneous mixture of mineral wool 12 and inorganic soil type, namely clay 13, entangled therein. The plug passage opening 9 lies in a recessed strip portion 14 so that the upper surface 16 of agroplug 11 provided with a seed cavity 15 lies beneath the top surface 17 of plug strip 5. The recessed portion 14 round the agroplug 11 forms a temporary water reservoir. After germination and rooting of a seed 18 with the forming of a root system 19 and a young plant 20, the agroplug 11 can be pressed downward wholly mechanically out of the plug strip 5 and placed in the open field 21. Since according to the invention the suction pressure of the agroplug 11 and the open ground 21 are geared to one another, there will be, as a consequence of the resulting capillary dynamics, a sufficiently high moisture content present in the agroplug until the roots have grown into the open field. Thus avoided in the first instance is a withering and dying of the planted out plant, or in less serious circumstances a temporary slow-down in growth.

If desired a fertilizer or mixture of fertilizers may be added to the mixture of soil and mineral wool from which the agroblock is formed. These fertilizers are of a conventional type and used to impart the agroblock additional nitrogen-, phosphorus-, and/or potassium containing compounds and/or trace elements beneficial to or promoting plant growth and/or seed germination. Accordingly, the grower may just add water to the agrosystem.

Although the agroblock is primarily used as agroplug other forms may be just in holders for household plant growing, for green noise insulating walls and the like.

TABLE 1

Water retaining capability of the agroplug according to the invention of a peat plug and a "Vienna roll" as a function of composition and density

| # | Agroplug Mineral wool (granulate) (%) | Soil type[3] (clay) (%) | Density (kg/m$^3$) | Water retaining capability (pF = 2)[1] |
|---|---|---|---|---|
| 1 | 100 | 0 | 55 | 0 |
| 2 | 50 | 50 | 220 | 8 |
| 3 | 25 | 75 | 380 | 20 |
| 4 | 25 | 75 | 520 | 26 |
| 5 | 25 | 75 | 580 | 31 |
| 6 | 25 | 75 | 760 | 39 |
| 7 | 10 | 90 | 840 | 38 |
| 8 | 0 | 100 | 1180 | 52 |
| 9 | 50 | peat | 360 | 17 |
| 10 | 50[2] | 50 | 630 | 19 |

[1] The water retaining capability of pF 2
[2] "Vienna roll": rolled up layers of mineral wool/clay
[3] Amount of material smaller than 20 micrometer: 45-50%

TABLE 2 water retaining capability of agroplugs according to the invention using clay comprising 25-30% particles smaller than 20 μm.

| # | mineral wool (granulate) (%) | clay (%) | density (kg/m$^3$) | water retaining capability (vol. %, pF = 2) |
|---|---|---|---|---|
| 11 | 40 | 60 | 290 | 7 |
| 12 | 33 | 67 | 370 | 10 |
| 13 | 25 | 75 | 540 | 15 |
| 14 | 18 | 82 | 620 | 20 |

TABLE 2-continued water retaining capability of agroplugs according to the invention using clay comprising 25-30% particles smaller than 20 μm.

| # | mineral wool (granulate) (%) | clay (%) | density (kg/m³) | water retaining capability (vol. %, pF = 2) |
|---|---|---|---|---|
| 15 | 10 | 90 | 840 | 28 |

We claim:

1. Agroblock comprising an inorganic soil type, such that the agroblock has a density of 25-1100 kg/cm³, is substantially form-retaining at any moisture content and that at a suction pressure of pF 2 the moisture content amounts to at least 15% by volume.

2. Agroblock as claimed in claim 1, comprising a homogeneous mixture of mineral wool and said inorganic soil type.

3. Agroblock as claimed in claim 2 wherein at a pF of 2 the moisture content amounts to at least 20% by volume.

4. Agroblock as claimed in claim 3 wherein at a pF of 2 the moisture content amounts to at least 25% by volume.

5. Agroblock as claimed in claim 1 having a quantity of mineral wool amounts to 0-90% by weight, and the amount of inorganic soil type amounts to 100-10% by weight.

6. Agroblock as claimed in claim 5, wherein the quantity of mineral wool amounts to 10-50% by weight, and the amount of soil type amounts to 90-50% by weight.

7. Agroblock as claimed in claim 6, wherein the quantity of mineral wool amounts to 10-25% by weight, and the amount of soil type amounts to 90-75% by weight.

8. Agroblock as claimed in claim 1, wherein a binder is present in a quantity of up to 0-15% by weight.

9. Agroblock as claimed in claim 8 wherein the binder is present in a quantity of 2 to 10% by weight, the agroblock has a density of 300-900 kg/m³ and has a porosity of at least 60%.

10. Agroblock as claimed in claim 9 wherein the binder is present in a quantity of 3 to 7% by weight and the agroblock has a density of 500 to 850 kg/m³.

11. Agroblock as claimed in claim 1 with a porosity of at least 50%.

12. Agroblock as claimed in claim 1 comprising numeral wool fibers and wherein the fibre direction of the mineral wool fibres extends substantially in height direction of the agroplug.

13. Agroblock as claimed in claim 1 with a substantially conical form.

14. Agroblock system for supporting agroblocks comprising a tray and at least one plug strip, said tray having at least one groove which receives said plug strip, said plug strip having a passage opening which receives said agroblock, said agroblock comprising an inorganic soil type, such that the agroblock has a density of 25-1100 kg/cm, is substantially form-retaining at any moisture content and that at a suction pressure of pF 2 the moisture content amounts to at least 15% by volume.

15. Agroblock system as claimed in claim 14, wherein the plug passage openings are provided with downward converging passage opening edges between which the agroblock can be clamp fitted.

16. Agroblock system as claimed in claim 4 wherein the passage openings are located in a recessed portion of said plug strips, such that said recessed portion extends above a top end of the agroblock accommodated in the passage opening.

17. Agroblock as claimed in claim 1, wherein said inorganic soil type is in the form of particles having a particle size below 20 micrometers.

18. Agroblock comprising 10-50% by weight mineral wool, 90-50% by weigth of hydrophilic clay particles having a particle size below 20 micrometers and up to 15% by weight of a binder, said agroblock having a density of 25-1100 kg/m³, a porocity of at least 50% and a moisture content of at least 15% by volume at a suction pressure of pF 2.

19. Agroblock as claimed in claim 18 wherein the quantity of mineral wool is 10-50% by weight, the quantity of clay particles is 90-50% by weight, the amount of binder is 2 to 10% by weight, the density is 300-900 kg/m³, the porosity is at least 60% and moisture content is at least 20% by volume.

20. Agroblock as claimed in claim 19 wherein the quantity of mineral wool is 10-25% by weight, the amount of clay particles is 90-75% by weight, the amount of binder is 3-7% by weight, the density is 500-850 kg/m³ and the water content is at least 25% by weight.

* * * * *